US010575693B2

(12) United States Patent
Conrad

(10) Patent No.: US 10,575,693 B2
(45) Date of Patent: Mar. 3, 2020

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 124 days.

(21) Appl. No.: 15/860,195

(22) Filed: Jan. 2, 2018

(65) Prior Publication Data
US 2019/0200829 A1    Jul. 4, 2019

(51) Int. Cl.
| *B01D 45/16* | (2006.01) |
| *A47L 9/10* | (2006.01) |
| *A47L 9/16* | (2006.01) |
| *A47L 5/24* | (2006.01) |
| *B04C 5/28* | (2006.01) |
| *B04C 5/08* | (2006.01) |
| *B04C 5/185* | (2006.01) |
| *B04C 5/26* | (2006.01) |

(52) U.S. Cl.
CPC ............ *A47L 9/1608* (2013.01); *A47L 5/24* (2013.01); *A47L 9/106* (2013.01); *A47L 9/16* (2013.01); *A47L 9/1625* (2013.01); *A47L 9/1633* (2013.01); *A47L 9/1641* (2013.01); *A47L 9/1683* (2013.01); *B01D 45/16* (2013.01); *B04C 5/08* (2013.01); *B04C 5/185* (2013.01); *B04C 5/26* (2013.01); *B04C 5/28* (2013.01)

(58) Field of Classification Search
CPC ........... B01D 45/12; B01D 45/16; A47L 9/10; A47L 9/16; A47L 9/1625; A47L 9/1683
USPC .............................. 55/429, 432, 433; 15/353
See application file for complete search history.

(56) References Cited

U.S. PATENT DOCUMENTS

| 3,822,533 | A | 7/1974 | Oranje |
| 5,129,125 | A | 7/1992 | Gamou et al. |
| 7,803,207 | B2 | 9/2010 | Conrad |
| 7,811,349 | B2 | 10/2010 | Nguyen |
| 7,857,878 | B2 | 12/2010 | Park et al. |
| 8,156,609 | B2 * | 4/2012 | Milne .................. A47L 5/24 |
| | | | 15/344 |
| 8,640,304 | B2 | 2/2014 | Conrad |

(Continued)

FOREIGN PATENT DOCUMENTS

| WO | 2008070962 A1 | 6/2008 |
| WO | 2009026709 A1 | 3/2009 |

*Primary Examiner* — Robert A Hopkins
(74) *Attorney, Agent, or Firm* — Philip C. Mendes da Costa; Bereskin & Parr LLP/S.E.N.C.R.L., s.r.l.

(57) ABSTRACT

A surface cleaning apparatus comprises an air flow path extending from a dirty air inlet to a clean air outlet; a suction motor provided in the air flow path; and a cyclone bin assembly comprising first and second stage cyclones. The first stage cyclone is provided in the air flow path and comprises a first stage cyclone chamber having a first stage second end wall that is spaced from a first stage first end wall. The second stage cyclone is provided in the air flow path downstream of the first stage cyclone and comprises a second stage cyclone chamber having a second stage second end wall that is spaced from a second stage first end wall. The first stage second end wall and the second stage second end wall are concurrently openable and the second stage second end wall may be moveable separately from the first stage second end wall.

20 Claims, 13 Drawing Sheets

(56) References Cited

U.S. PATENT DOCUMENTS

| 9,005,324 B2* | 4/2015 | Smith .................... A47L 5/24 |
| | | 55/337 |
| 2005/0198770 A1 | 9/2005 | Jung et al. |
| 2006/0168922 A1 | 8/2006 | Oh |
| 2014/0237768 A1 | 8/2014 | Conrad |

* cited by examiner

SURFACE CLEANING APPARATUS

TECHNICAL FIELD

This disclosure relates generally to surface cleaning apparatuses, and, in particular to surface cleaning apparatuses with a dual cyclone assembly, dual arrestor plates and dual openable doors.

BACKGROUND

The following is not an admission that anything discussed below is part of the prior art or part of the common general knowledge of a person skilled in the art.

Various types of surface cleaning apparatuses are known. Such surface cleaning apparatuses include vacuum cleaners, including upright vacuum cleaners, hand carriable vacuum cleaners, canister-type vacuum cleaners and Shop-Vac™ type vacuum cleaners. Further, various designs for cyclonic hand vacuum cleaners, including dual cyclone assemblies, are known in the art.

U.S. Pat. No. 7,803,207 discloses a cyclone wherein a plate is positioned at the lower end of a cyclone chamber and above a dirt collection chamber. The plate is positioned inward from the outer wall of the sidewall of cyclone chamber so as to define a gap between the outer peripheral edge of the plate and the inner wall of the cyclone chamber. The plate may be pivotally mounted to the sidewall so that opening a lower door of the dirt collection chamber also permits the plate to pivot to an open position in which access is provided to the cyclone chamber.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

According to one broad aspect, a surface cleaning apparatus has two cyclonic stages which are arranged in series wherein the dual cyclonic stages are nested. Each cyclonic stage has a wall distal to the air outlet end of the cyclone. A dirt outlet is provided between the distal wall and a sidewall of the cyclone. Accordingly, particulate matter separated in a cyclone chamber may travel to a dirt collection region exterior to the cyclone chamber by passing through the dirt outlet. The distal walls of the cyclonic stages are openable. The distal walls may be concurrently openable. In some embodiments that may be moveable separately from each other. When the distal walls are opened, the cyclonic chambers and dirt collections regions are emptyable. An advantage of this design is that both cyclonic stages may be emptied concurrently.

In accordance with this aspect, there is provided a surface cleaning apparatus comprising:
(a) an air flow path extending from a dirty air inlet to a clean air outlet;
(b) a suction motor provided in the air flow path;
(c) a cyclone bin assembly comprising first and second stage cyclones;
(d) the first stage cyclone provided in the air flow path, the first stage cyclone comprising a first stage cyclone chamber and a first stage dirt collection region external to the first stage cyclone chamber, the first stage cyclone chamber having a first stage air inlet, a first stage air outlet, a first stage dirt outlet, a first stage sidewall, a first stage first end wall and a first stage second end wall that is spaced from the first stage first end wall, wherein the first stage dirt outlet comprises a space between the first stage second end wall and the first stage sidewall and wherein the first stage second end wall is moveable between a closed position in which the first stage sidewall and the first stage second end wall define the first stage dirt outlet and an open position in which an end of the first stage cyclone chamber is open; and,
(e) the second stage cyclone provided in the air flow path downstream of the first stage cyclone, the second stage cyclone comprising, a second stage cyclone chamber and a second stage dirt collection region external to the second stage cyclone chamber, the second stage cyclone chamber having a second stage air inlet, a second stage air outlet, a second stage dirt outlet, a second stage sidewall, a second stage first end wall and a second stage second end wall that is spaced from the second stage first end wall, wherein the second stage dirt outlet comprises a space between the second stage second end wall and the second stage sidewall and wherein the second stage second end wall is moveable between a closed position in which the second stage sidewall and the second stage second end wall define the second stage dirt outlet and an open position in which an end of the second stage cyclone chamber is open,
wherein the first stage second end wall and the second stage second end wall are concurrently openable and the second stage second end wall is moveable separately from the first stage second end wall.

In any embodiment, the first stage dirt collection region may have a first stage distal wall that is spaced from and faces the first stage second end wall and the first stage distal wall may be moveably mounted to the cyclone bin assembly and the second stage dirt collection region may have a second stage distal wall that is spaced from and faces the second stage second end wall and the second stage distal wall may be moveably mounted to the cyclone bin assembly. Optionally, when the first stage and second stage distal walls are in the open position, the first stage and second stage distal walls are biased apart.

In any embodiment, the first stage distal wall may rotate open to a first position which defines a first opening angle between the first stage distal wall and the cyclone bin assembly and the second stage distal wall may rotate open to a second position which defines a second opening angle between the second stage distal wall and the cyclone bin assembly and the second opening angle may be greater than the first opening angle.

In any embodiment, when the first stage distal wall and the second stage distal wall are in the open position, the first stage distal wall and the second stage distal wall may be biased apart.

In any embodiment, the second stage cyclone chamber may be nested inside the first stage cyclone.

In any embodiment, the first stage second end wall may be mounted to a portion of the second stage cyclone.

In any embodiment, the first stage second end wall may be fixedly mounted to a support member extending generally axially from the first stage distal wall.

In any embodiment, the first stage air inlet may be provided adjacent the first stage first end wall, the second stage air inlet may be provided adjacent the second stage first end wall.

In accordance with this aspect, there is also provided a surface cleaning apparatus comprising:

(a) an air flow path extending from a dirty air inlet to a clean air outlet;
(b) a suction motor provided in the air flow path;
(c) a cyclone bin assembly comprising first and second stage cyclones;
(d) the first stage cyclone provided in the air flow path, the first stage cyclone comprising a first stage cyclone chamber and a first stage dirt collection region, the first stage cyclone chamber having a first stage air inlet, a first stage air outlet, a first stage dirt outlet, a first stage first end wall and a first stage second end wall that is spaced from the first stage first end wall, wherein the first stage second end wall is moveable between a closed position in which the first stage cyclone chamber is closed and an open position in which an end of the first stage cyclone chamber is open; and,
(e) the second stage cyclone provided in the air flow path downstream of the first stage cyclone, the second stage cyclone comprising a second stage cyclone chamber and a second stage dirt collection region external to the second stage cyclone chamber, the second stage cyclone chamber having a second stage air inlet, a second stage air outlet, a second stage dirt outlet, a second stage sidewall, a second stage first end wall and a second stage second end wall that is spaced from the second stage first end wall, wherein the second stage second end wall is moveable between a closed position in which the second stage cyclone chamber is closed and an open position in which an end of the second stage cyclone chamber is open,
wherein the first stage second end wall is provided on a portion of the second stage cyclone and the first and second dirt collection regions are concurrently openable.

In any embodiment, the first stage second end wall may be provided on a moveable portion of the second stage cyclone.

In any embodiment, the first stage dirt collection region may have a first stage distal wall that is spaced from and faces the first stage second end wall and the first stage second end wall may be fixedly mounted to a support member extending generally axially from the first stage distal wall.

In any embodiment, the second stage cyclone chamber may be nested inside the first stage cyclone.

In any embodiment, when the first and second dirt cyclone chambers are open, the first and second end walls may be biased apart.

In any embodiment, the first stage dirt collection region may have a first stage distal wall that is spaced from and faces the first stage second end wall, the second stage dirt collection region may have a second stage distal wall that is spaced from and faces the second stage second end wall and the first and second stage distal walls may define opposed ends of the second stage dirt collection region.

In accordance with this aspect, there is also provided a surface cleaning apparatus comprising:

(a) an air flow path extending from a dirty air inlet to a clean air outlet;
(b) a suction motor provided in the air flow path;
(c) a cyclone bin assembly comprising first and second stage cyclones;
(d) the first stage cyclone provided in the air flow path, the first stage cyclone comprising a first stage cyclone chamber and a first stage dirt collection region, the first stage cyclone chamber having an openable first stage end wall, wherein the first stage end wall is moveable between a closed position in which the first stage cyclone chamber is closed and an open position in which an end of the first stage cyclone chamber is open; and,
(e) the second stage cyclone provided in the air flow path downstream of the first stage cyclone, the second stage cyclone comprising a second stage cyclone chamber and a second stage dirt collection region external to the second stage cyclone chamber, the second stage cyclone chamber having an openable second stage end wall, wherein the second stage end wall is moveable between a closed position in which the second stage cyclone chamber is closed and an open position in which an end of the second stage cyclone chamber is open,
wherein the first stage distal wall is a wall of the second stage dirt collection region.

In any embodiment, the first stage end wall may be provided on a portion of the second stage cyclone and the first and second cyclone chambers may be concurrently openable.

In any embodiment, the first stage second end wall may be provided on a moveable portion of the second stage cyclone.

In any embodiment, when the first and second end walls are in the open position, the first and second end walls may be biased apart.

In any embodiment, the first end wall may rotate open to a first position which defines a first opening angle between the first end wall and the cyclone bin assembly and the second end wall may rotate open to a second position which defines a second opening angle between the second end wall and the cyclone bin assembly and the second opening angle may be greater than the first opening angle.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
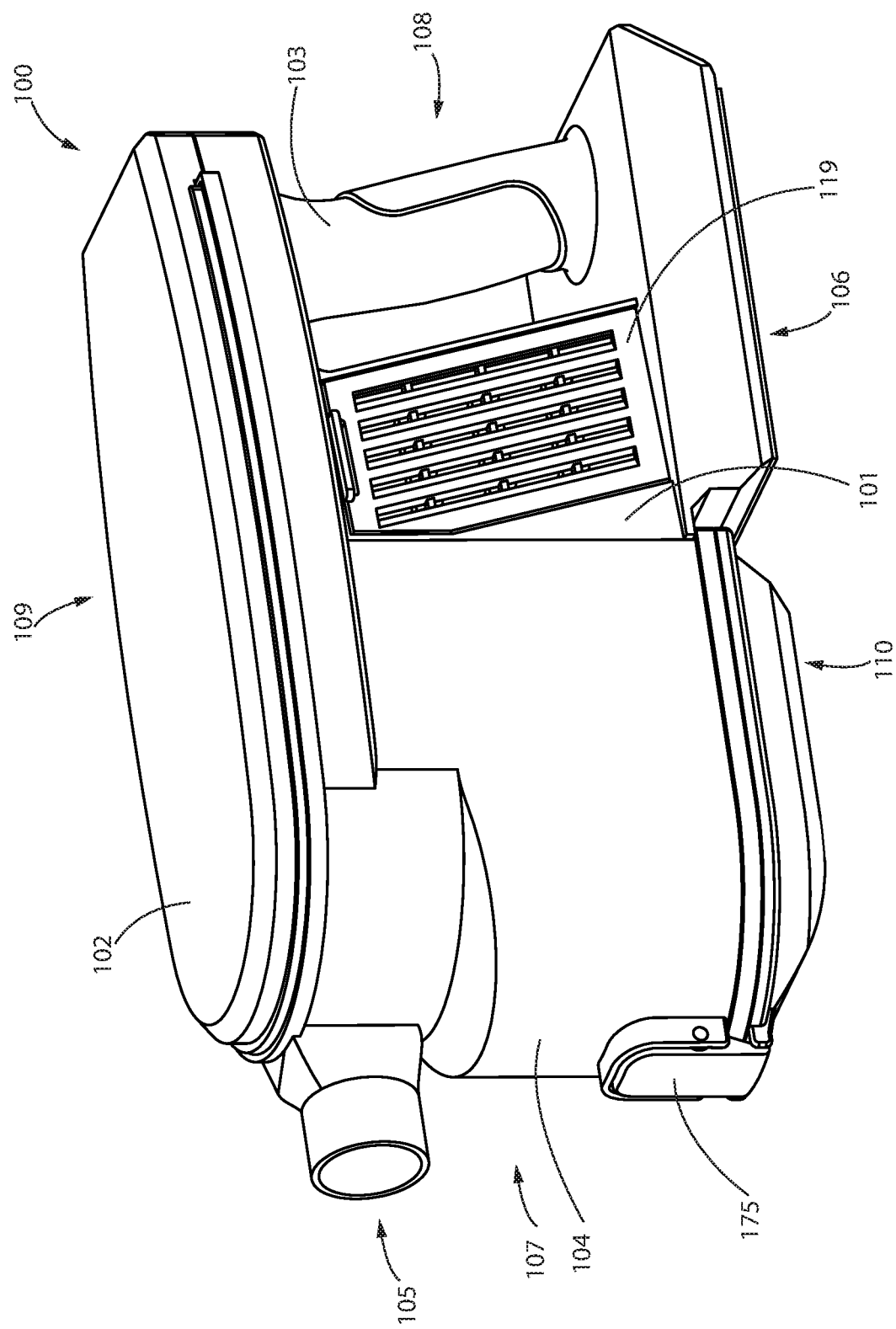
FIG. 1 is a perspective view of a surface cleaning apparatus having a dual cyclone bin assembly with dual end plates and dual openable doors, wherein each openable door and end plate is in a closed position, according to one embodiment.

Referring to FIG. 1, illustrated therein is an exemplary embodiment of a surface cleaning apparatus shown generally as 100.

In the illustrated embodiment, the surface cleaning apparatus 100 is a hand vacuum cleaner, which may also be referred to as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, the handle and a clean air inlet may be rigidly coupled to each other (directly or indirectly) so as to move as one while maintaining a constant orientation relative to each other. This is to be contrasted with canister and upright vacuum cleaners, whose weight is typically supported by a surface (e.g. a floor) during use.

Figure 2:
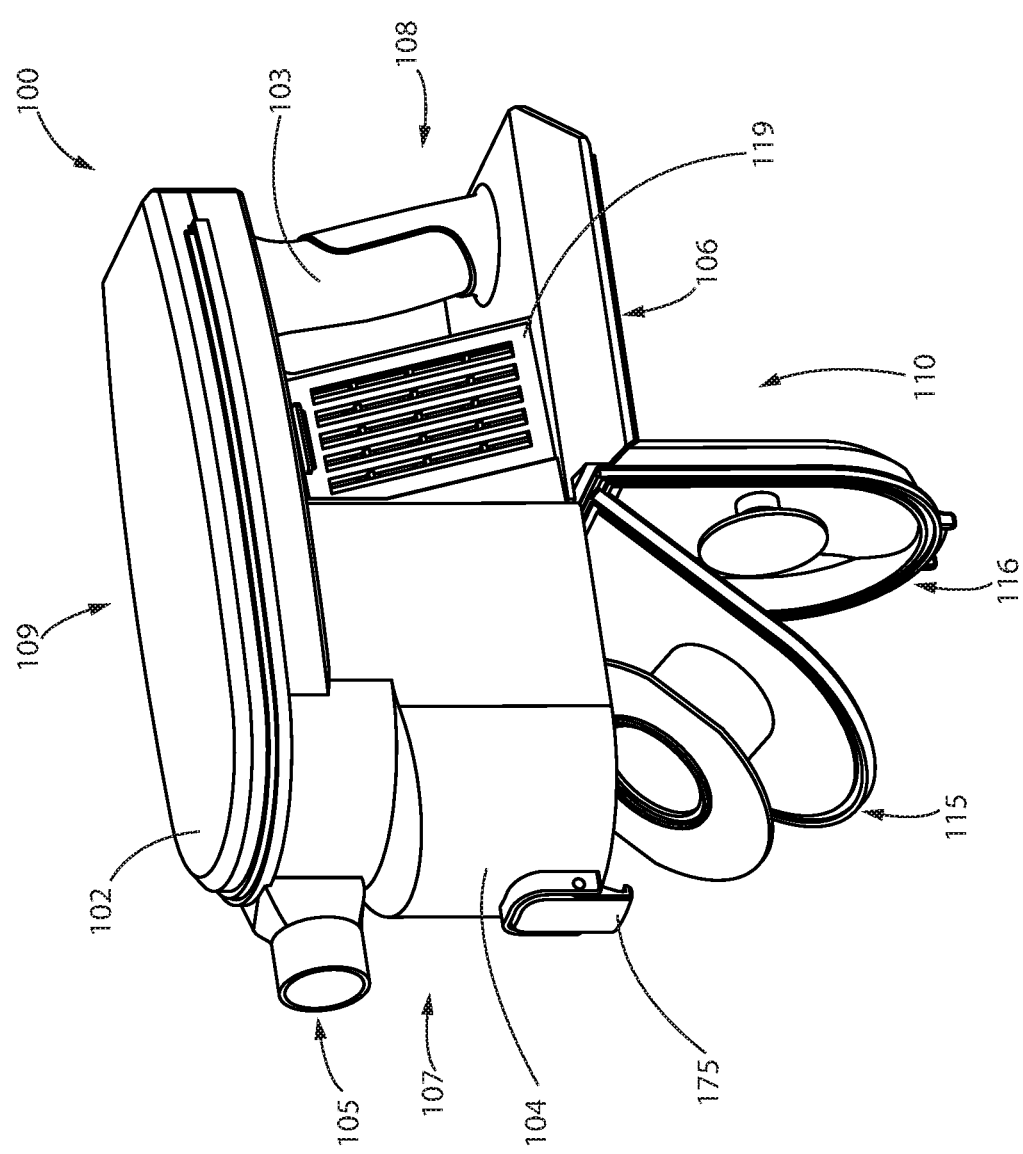
FIG. 2 is a perspective view of the surface cleaning apparatus of FIG. 1 having a dual cyclone bin assembly with dual end plates and dual openable doors, wherein each openable door and end plate is in an open position.

As exemplified in FIGS. 1 and 2, surface cleaning apparatus 100 includes a main body 101 having a housing 102 and a handle 103, an air treatment member 104 connected to the main body 101, a dirty air inlet 105, a clean air outlet 106, and an air flow path extending between the dirty air inlet and the clean air outlet.

Surface cleaning apparatus 100 has a front end 107, a rear end 108, an upper end or top 109, and a lower end or bottom 110. In the embodiment shown, dirty air inlet 105 is at an upper portion or upper end of the front end 107 and clean air outlet 106 is at rearward portion of the lower portion or lower end 110. It will be appreciated that the dirty air inlet 105 and the clean air outlet 106 may be provided in different locations.

A suction motor 120 (see e.g. FIG. 3) is provided to generate vacuum suction through the air flow path, and is positioned within a motor housing 119. In the illustrated embodiment, the suction motor 120 is positioned downstream from the air treatment member 104, although it may be positioned upstream of the air treatment member 104 (e.g., a dirty air motor) in alternative embodiments.

Air treatment member 104 is configured to remove particles of dirt and other debris from the air flow and/or otherwise treat the air flow.

Figure 3:
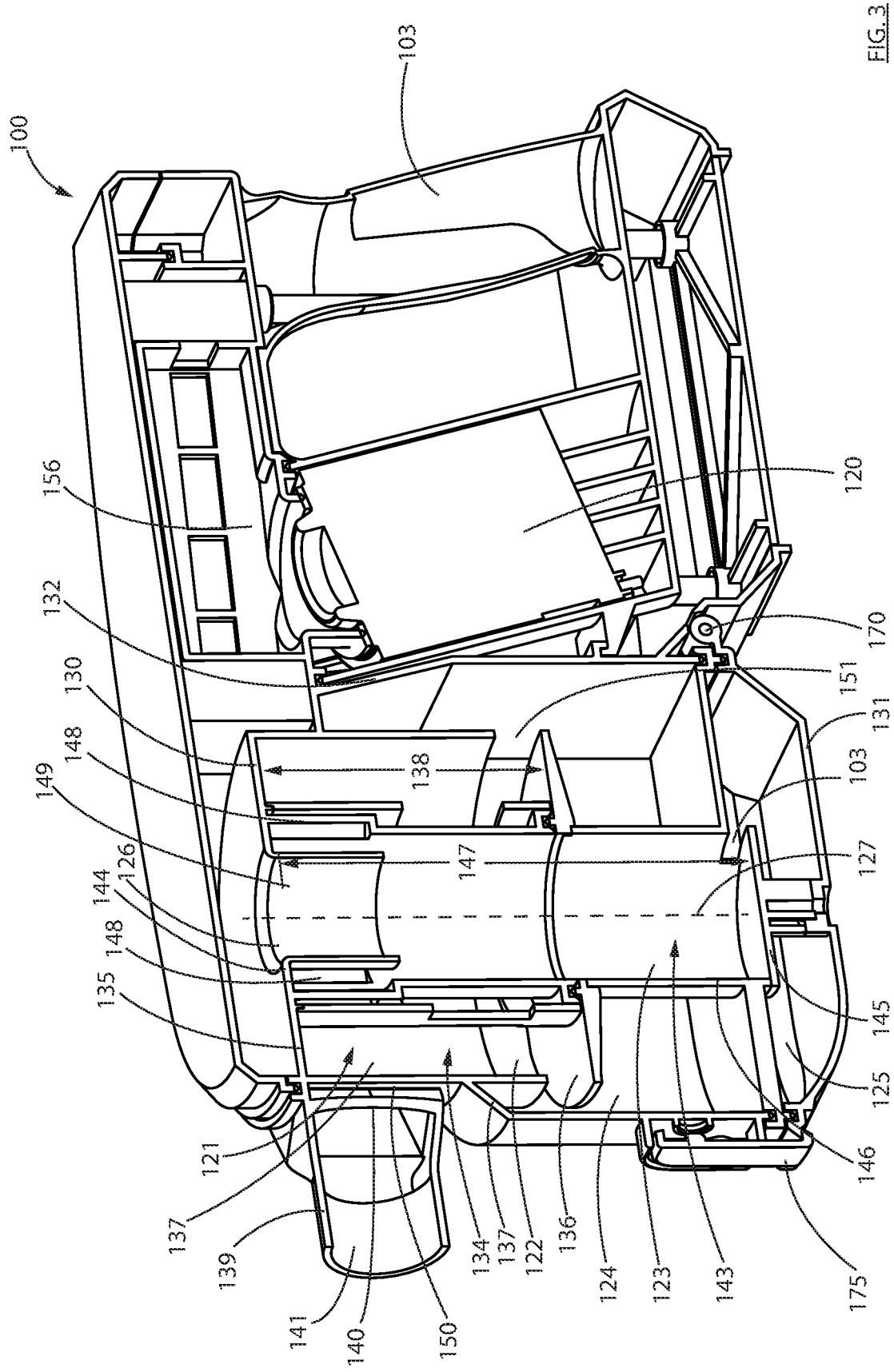
FIG. 3 is a cross-section view from front to back of the surface cleaning apparatus of FIG. 1, wherein each openable door and end plate is in the closed position.
Figure 4:
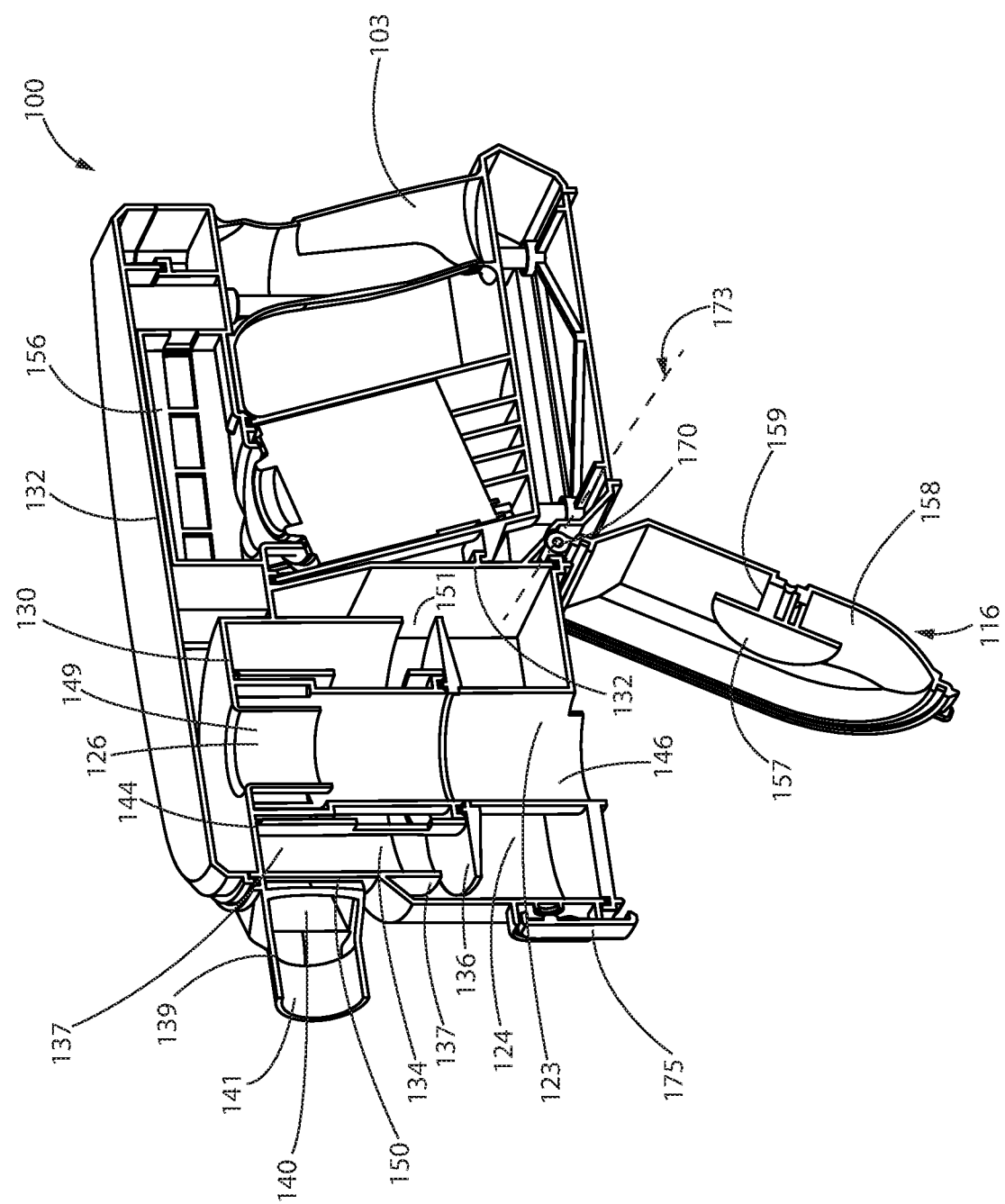
FIG. 4 is a cross-section view from front to back of the surface cleaning apparatus of FIG. 1 with the first stage dirt collection chamber door in the closed position and the second stage dirt collection chamber door in the open position.
Figure 5:
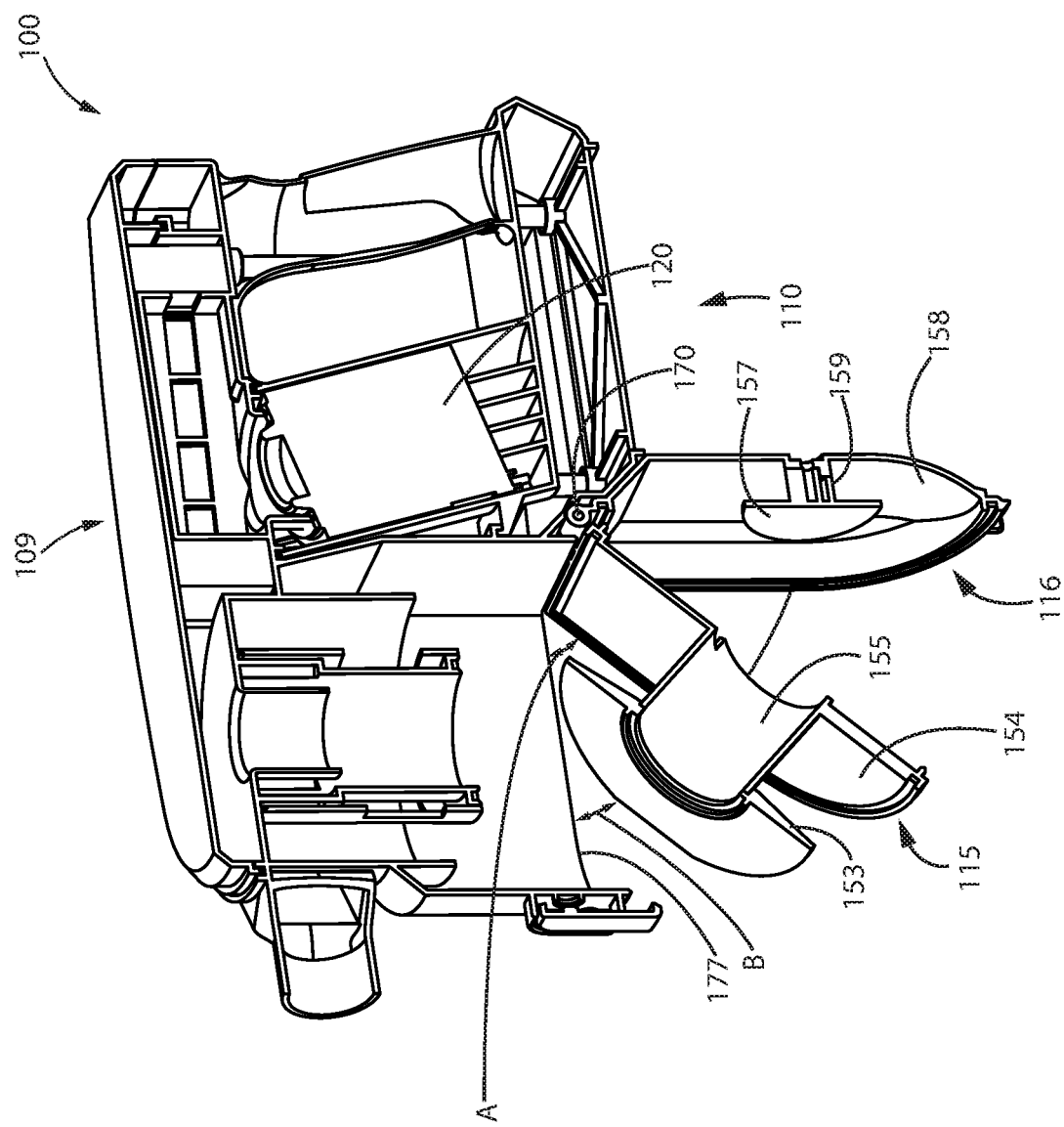
FIG. 5 is a cross-section view from front to back of the surface cleaning apparatus of FIG. 1, wherein each openable door and end plate is in an open position.

As exemplified in FIGS. 3-5, the air treatment member 104 comprises a cyclonic cleaning unit or a two-stage cyclone assembly 121 having a first stage cyclone 122 and a second stage cyclone 123 that is arranged in series, downstream from the first stage cyclone 122. It will be appreciated that each cyclonic stage may comprise a single cyclone as exemplified or a plurality of cyclones in parallel.

As exemplified, each cyclonic stage of the cyclone assembly 121 is provided with dirt collection region that may be external to the cyclone chamber of that stage. Each dirt collection region may be a dirt collection chamber that is axially aligned with its respective cyclone chamber. As exemplified, a first stage dirt collection region or chamber 124 is provided to receive dirt separated by the first stage cyclone 121, and a second stage dirt collection region or chamber 125 is provided to receive dirt separated by the second stage cyclone 123. The first stage cyclone 122 defines a first cyclone axis 126, about which air circulates when in the first stage cyclone 122, and the second stage cyclone 123 defines a second cyclone axis 127, about which air circulates when in the second stage cyclone 123. The cyclone axes 126 and 127 may be generally parallel and, as exemplified in the illustrated embodiment (see FIG. 3) the cyclone axes 126 and 127 are both parallel and co-axial with each other. In other arrangements, the cyclone axes 126 and 127 need not be parallel or co-axial with each other.

As exemplified in FIGS. 3-5, cyclone assembly 121 includes a first end wall 130, an opposing second end wall 131 and a side wall 132 extending therebetween. The cyclone assembly 121 may be formed from any suitable material, including plastic, metal and composite materials, and optionally at least a portion of the cyclone assembly may be transparent to allow a user to see the interior of the cyclone assembly while the hand vacuum 100 is in use.

The first stage cyclone 122 may be of various configurations. The first stage cyclone 122 is positioned within the cyclone assembly 121 and includes a first cyclone chamber 134 that is generally bounded by a first end wall 135, a second end wall 136 and a first cyclone sidewall 137 extending along a first cyclone length 138 (FIG. 3) therebetween. As exemplified, the first end wall 135 may be the first end wall 130 and the bottom or inner surface of end wall 130 may be an inner surface of the cyclone assembly 121. In other embodiments, the first end wall 135 may be a separate part, which may be generally coincident with or abutting the first end wall 130 of the cyclone assembly 121. It will be appreciated that the first stage cyclone 122 may comprise part or all of the side wall 132 of cyclone assembly 121.

The first cyclone length 138 may be any suitable length, and may be between about 4 cm and 20 cm.

The first stage cyclone 122 also includes a tangential air inlet port 140 (see e.g. FIG. 3) through which air enters the first stage cyclone 122 from, e.g., an air inlet conduit 139. In the embodiment illustrated, the air inlet port 140 is provided in an upper portion of the first cyclone sidewall 137 toward the top end of the first stage cyclone 122 (i.e. proximate the first end wall 130 of the cyclone assembly 121), but in other embodiments the air inlet port 140 may be provided in other locations (e.g. toward the second end wall 131 of the cyclone assembly 121).

As exemplified in FIGS. 3-5, the air inlet conduit 139 may be configured so that it has an inlet/upstream end 141 that is positioned forward of the forward most end wall of at least one of the first and second dirt collection chamber 124 and 125. This may help facilitate using the inlet end 141 as a nozzle to directly clean a surface, and/or attaching a wand, hose or other accessory cleaning tool. In the embodiments illustrated, the inlet end 141 extends forwardly of the entire cyclone assembly 121, and is forward of the side wall 132 of the first stage cyclone 122 and the first cyclone side wall 137.

Also shown in the embodiments of FIGS. 3-5, a rear/outlet end 150 of the inlet conduit 139 is positioned rearward of the inlet end 141. As exemplified in these embodiments, the inlet conduit 139 at least partially overlaps the first stage cyclone 122 in the axial direction, and the outlet end 150 of the inlet conduit 139 terminates at the air inlet port 140 of the first stage cyclone, which is provided in the side wall 137 of the first stage cyclone 130.

Air may exit the first stage cyclone 122 by flowing generally radially inwardly through, e.g., a screen (not shown) that may be provided around the air outlet 149 of the first stage cyclone, which may be a conduit such as a vortex finder that is positioned at the air outlet end of the first stage cyclone chamber.

As exemplified, the air inlet conduit 139 and the air outlet 149 of the first stage cyclone may be at the same (e.g., upper) end of the cyclone chamber and at an opposed end at which the dirt outlet 151 of the cyclone chamber is provided.

The second stage cyclone 123 may be positioned in any suitable location in the air flow path, downstream from the first stage cyclone 122. Preferably, the second stage cyclone 123 may be at least partially nested within the first stage cyclone 122 (i.e., at least partially surrounded by the first stage cyclone 122) and may be fully nested therein. Nesting the second stage cyclone 123 within the first stage cyclone 122 may help reduce the overall length (front to back) of the cyclone assembly 121 and the hand vacuum 100.

In some embodiments, the second stage cyclone 123 may be oriented generally parallel or parallel to the first stage cyclone 122, and may be at least partially nested along the length 138 of the first stage cyclone 122 and may be generally co-axial or co-axial to the first stage cyclone 122. Optionally, the second stage cyclone 123 may be at least 50%, at least 60%, at least 70%, at least 80%, at least 90% and/or fully nested (i.e. 100% nested) within the first stage cyclone 122. If the second stage cyclone 123 is fully nested within the first stage cyclone 122, the overall length of the first and second stage cyclones 121, 122 in the axial direction may be equal to the first cyclone length 138. As exemplified in FIGS. 3-5, the second stage cyclone 123 is oriented parallel to the first stage cyclone 122 and the second stage cyclone 123 is positioned within (i.e. nested within) the first stage cyclone 122 and is co-axial therewith.

The second stage cyclone 123 may be of various configurations. As exemplified in FIGS. 3-5, the second stage cyclone 123 includes a second cyclone chamber 143 that is generally bounded by a first end wall 144 (see e.g. FIG. 3), an opposing second end wall 145 and a second cyclone sidewall 146 that extends axially along a second cyclone length 147 (FIG. 3) therebetween. The second cyclone length 147 may be any suitable length, and if the second stage cyclone 123 is to be entirely nested within the first stage cyclone 122, then the second cyclone length 147 may be selected so that it is equal to or less than the first cyclone length 138. Optionally, the second cyclone length 147 may be between about 2 cm and about 15 cm (or more), and may be between about. As exemplified, the second stage cyclone chamber has an axial length equal to the axial length of the first stage cyclone and the first stage dirt collection chamber.

The second stage cyclone 123 includes at least one air inlet 148 through which air enters the second stage cyclone 123, and at least one air outlet 149 through which air exits the second stage cyclone 123. The air inlet 148 and the air outlet 149 of the second stage cyclone may have the same configuration as the air inlet and outlet conduits of the first stage cyclone. Optionally, as exemplified, the air inlet 148 and the air outlet 149 of the second stage cyclone may be at the same end of the cyclone assembly as the air inlet conduit 139 and the air outlet 149 of the first stage cyclone. Alternately, or in addition, the air inlet 148 and the air outlet 149 of the second stage cyclone may be at an end opposed to the dirt outlet of the second stage cyclone.

Optionally, as discussed subsequently, the second stage cyclone 123 may include two or more air inlets that are spaced apart from each other around the perimeter of the second stage cyclone 123, preferably generally equally. The air inlets of the second stage cyclone 123 are in communication with, and downstream from, the air outlet of the first stage cyclone 122, and the air outlet of the second stage cyclone 123 is in communication with, and upstream from, the optional pre-motor filter housing 156. The air inlet ports and air outlet of the second stage cyclone 123 may be of any suitable configuration.

Optionally, the air inlet(s) 148 and air outlet 149 of the second stage cyclone 123 may be provided toward the same end of the second stage cyclone 123 or at opposing ends of the second stage cyclone 123. As shown in FIGS. 3-5, the air inlets 148 and air outlet 149 are both provided toward the first (e.g., upper) end of the second stage cyclone 123 (e.g., proximate the first end wall 144) and distal to the second end wall 145.

Optionally, the cyclone assembly 121 may be arranged so that the air inlet port 140 of the first stage cyclone 122 is provided at the same end of the cyclone assembly 121 as the air inlets 148 and/or air outlet 149 of the second stage cyclone 123. Alternatively, the air inlet port 140 may be at the opposite end from at least one of the air inlets 148 and/or air outlet 149. For example, in the embodiment of FIG. 4, the air inlet port 140 is provided proximate the first end wall 130, and is at the same end of the cyclone assembly 121 as both the air inlet ports 148 and the air outlet 149.

The following is a description of concurrently openable dirt collection chambers 124, 125 that may be used in any surface cleaning apparatus or in any combination or sub-combination with any other feature or features described herein.

In the embodiment illustrated herein, cyclone assembly 121 includes two dirt collection chambers, namely first stage dirt collection chamber 124 and second stage dirt collection chamber 125, that are external the first and second stage cyclones 122 and 123, for collecting and containing particulate matter separated by each cyclonic stage. Dirt and debris that is separated from the air flowing through cyclone assembly 121 (or other suitable air treatment members) may be collected in dirt collection chambers 124, 125.

The dirt collection chambers 124, 125 may be positioned in any suitable location and may be of any suitable configuration. As exemplified herein, each of the dirt collection chambers is positioned axially spaced from and aligned with (e.g., below) the respective cyclone chamber. Alternately, or in addition, as also exemplified, the width (e.g., diameter) of each dirt collection chamber in a direction transverse to the axis of the cyclone chamber may be greater than the width (e.g., diameter) of the respective cyclone chamber.

As exemplified herein, each of the dirt collection chambers may be openable or otherwise accessibly to help facilitate emptying the collected dirt and/or debris into a garbage can or other receptacle. Accordingly, each of the cyclone chambers may be openable. The cyclone chambers may be concurrently openable with each other or each cyclone chamber may be concurrently openable with its respective dirt collection chamber. Accordingly the first stage cyclone chamber and the first stage dirt collection chamber may be concurrently openable. Alternately, or in addition, the second stage cyclone chamber and the second stage dirt collection chamber may be concurrently openable. In a further alternate embodiment, the second stage cyclone chamber, the first stage dirt collection chamber and the second stage dirt collection chamber may be concurrently openable. In a further alternate embodiment, the first stage cyclone chamber, the second stage cyclone chamber, the first stage dirt collection chamber and the second stage dirt collection chamber may be concurrently openable.

Figure 6:
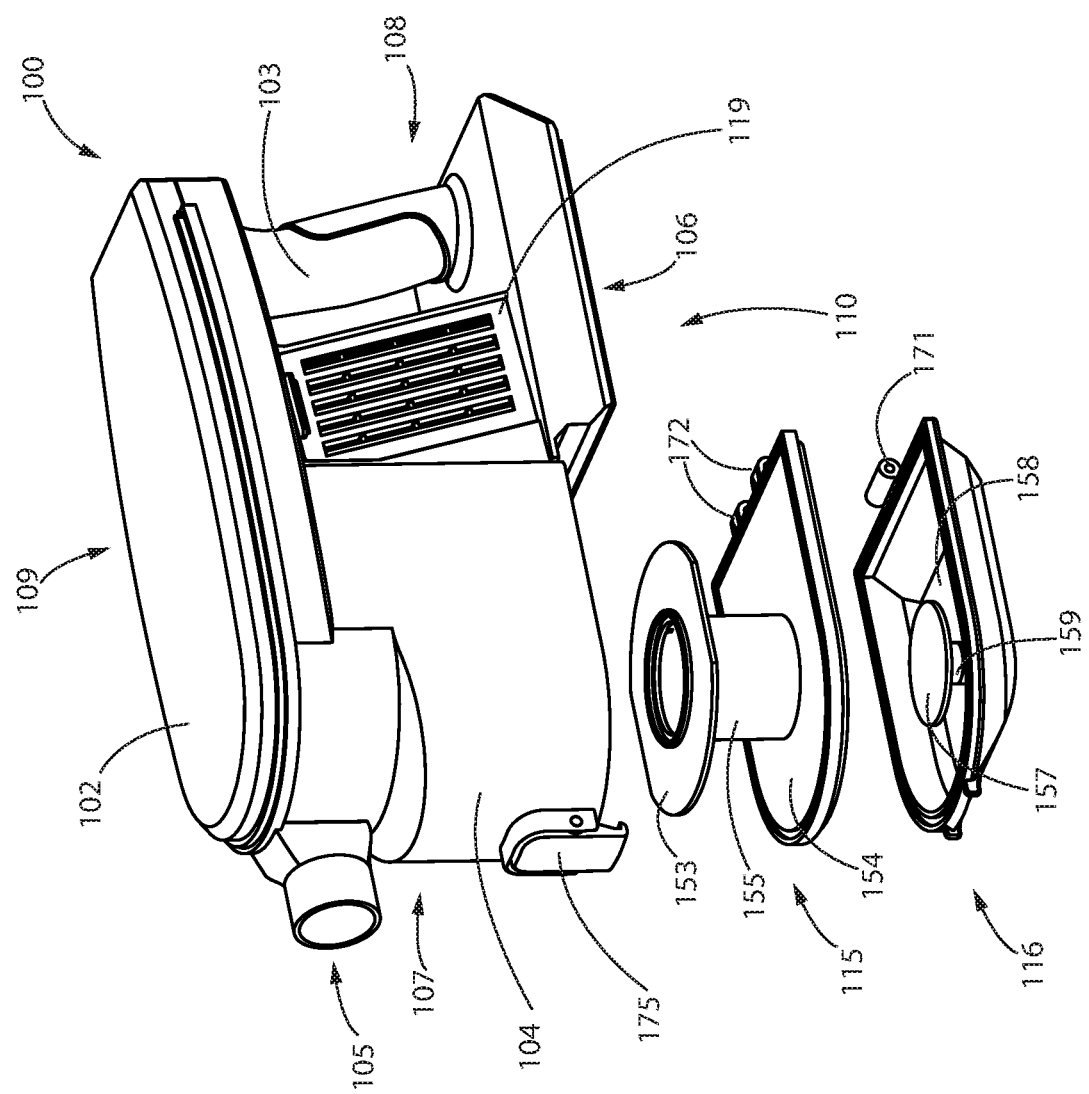
FIG. 6 is a partially exploded side perspective view of the surface cleaning apparatus of FIG. 1 wherein each of the first stage dirt collection chamber door and the second stage dirt collection chamber door are spaced apart from a body of the surface cleaning apparatus.
Figure 7:
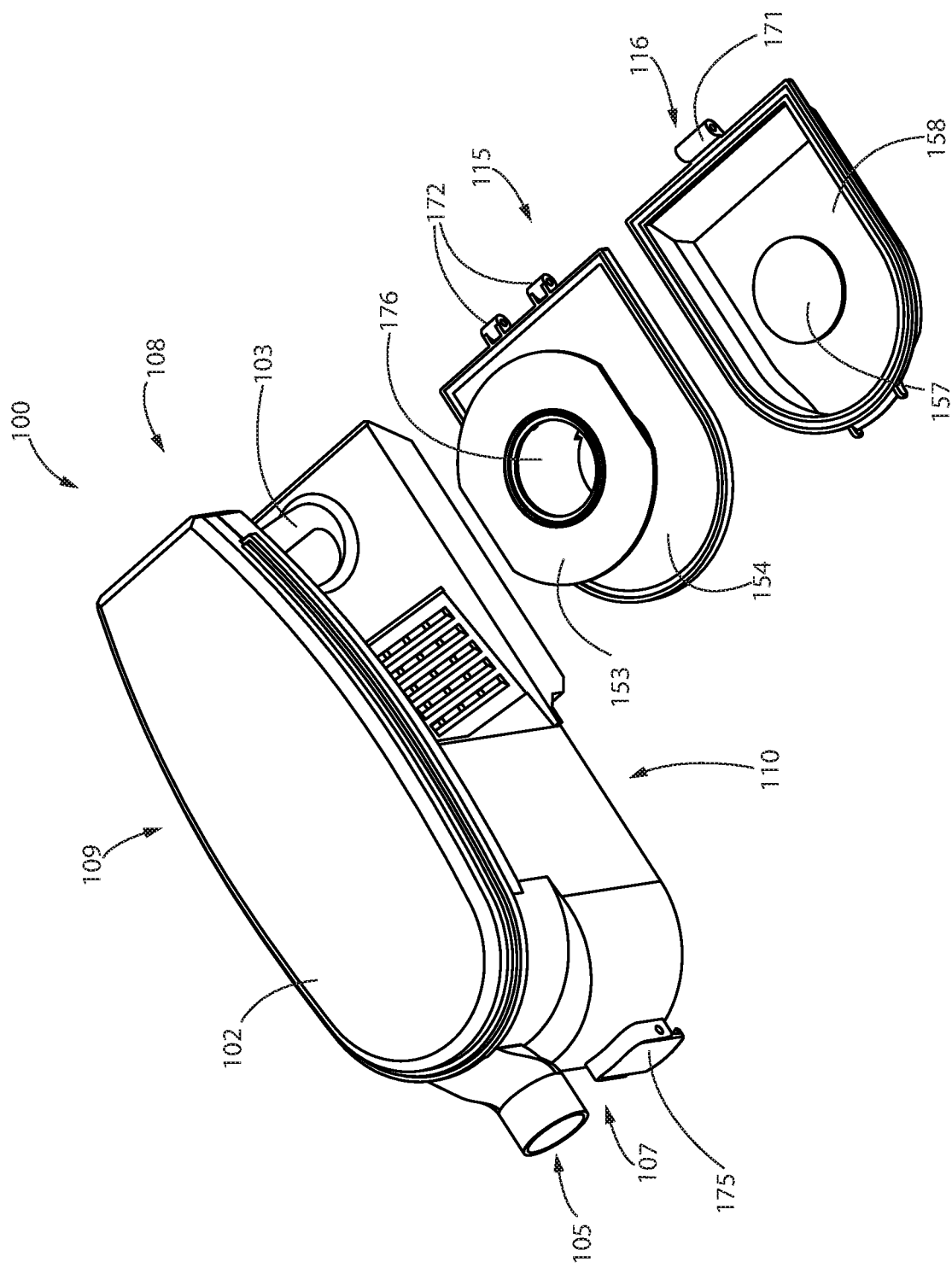
FIG. 7 is a partially exploded perspective view from above of the surface cleaning apparatus of FIG. 1 wherein each of the first stage dirt collection chamber door and the second stage dirt collection chamber door are spaced apart from a body of the surface cleaning apparatus.
Figure 8:
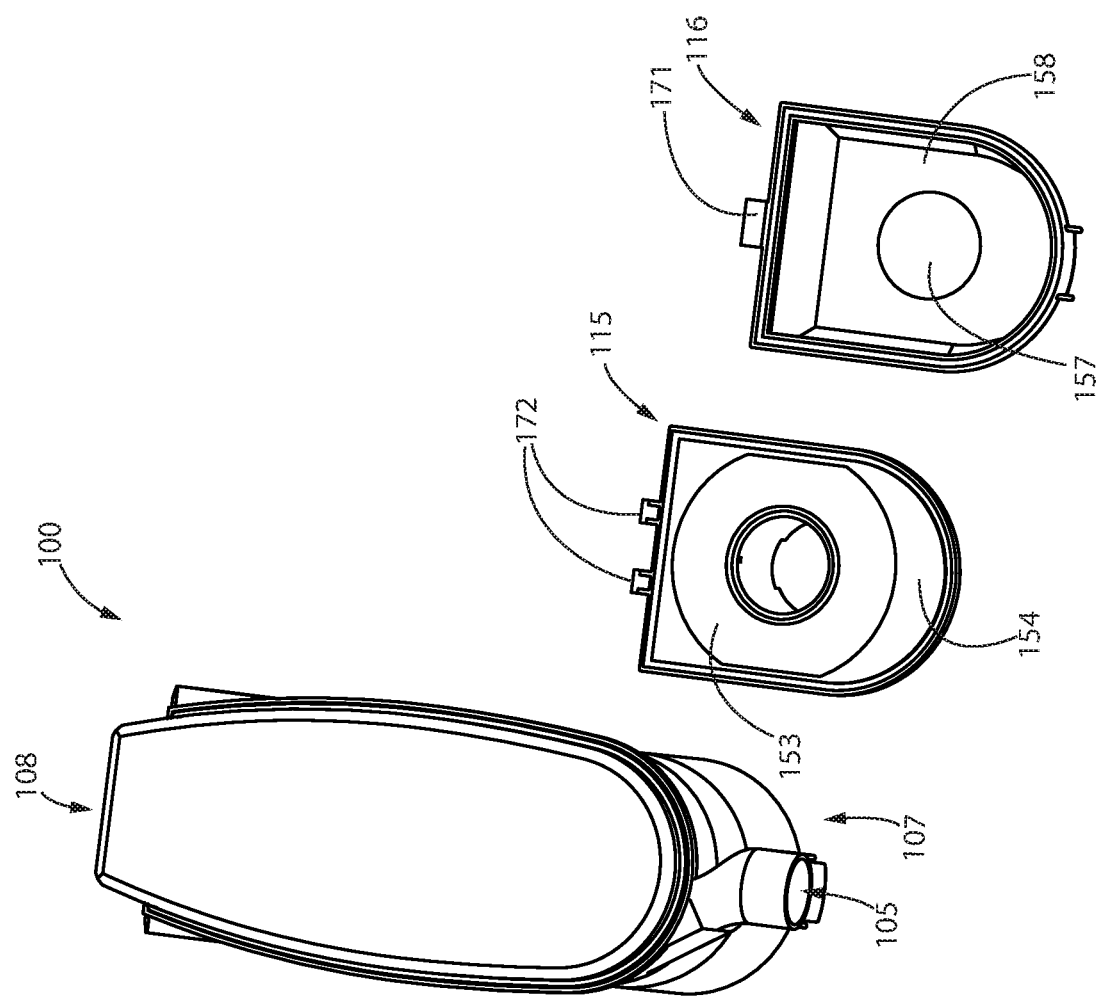
FIG. 8 is partially exploded top perspective view from above of the surface cleaning apparatus of FIG. 1 wherein each of the first stage dirt collection chamber door and the second stage dirt collection chamber door are spaced apart from a body of the surface cleaning apparatus.

FIGS. 6-8 show exploded perspective views of the apparatus 100 where the first door 115 of the first dirt collection chamber 124 and the second door 116 of the second dirt collection chamber 125 are positioned below the rest of the hand vacuum cleaner.

In accordance with this feature, the second ends of both of the first and second cyclone stages 122, 123 of cyclone assembly 121 may be configured as part of separate openable doors 115, 116 (e.g. see FIG. 2). When each of first door 115 and second door 116 is opened, the dirt collection chambers 124, 125, being external to the first and second stage cyclones 122, 123, can be emptied.

Figure 9:
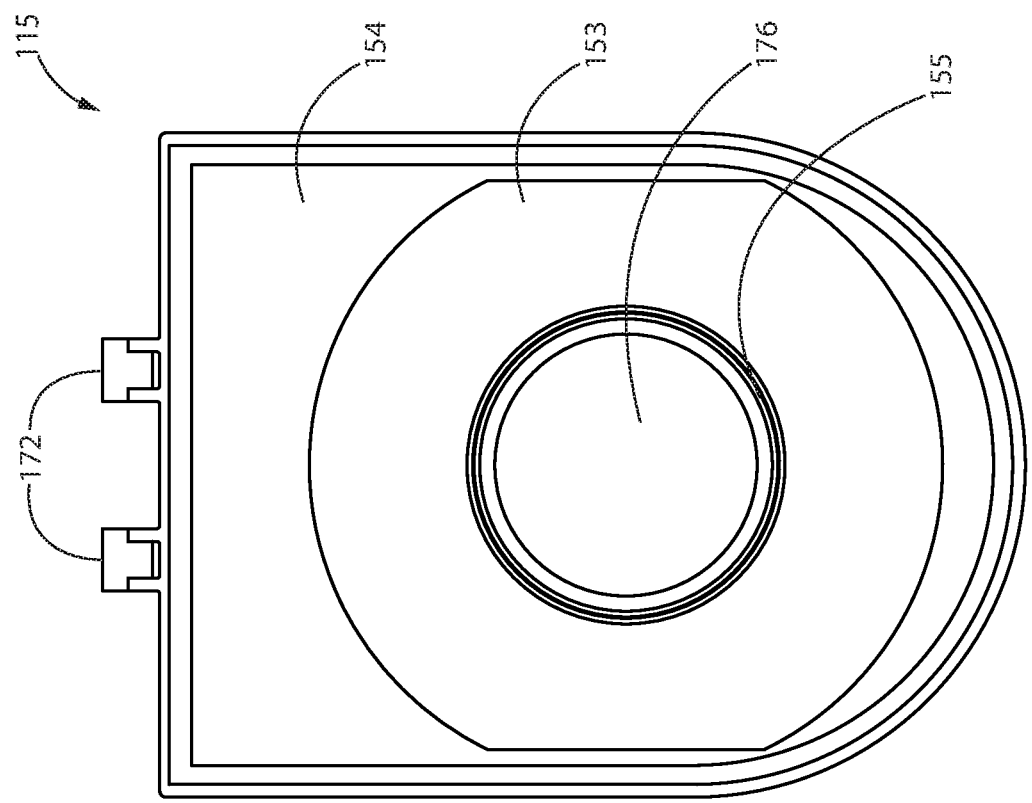
FIG. 9 is a top plan view of the first stage dirt collection chamber door of the surface cleaning apparatus of FIG. 1.
Figure 10:
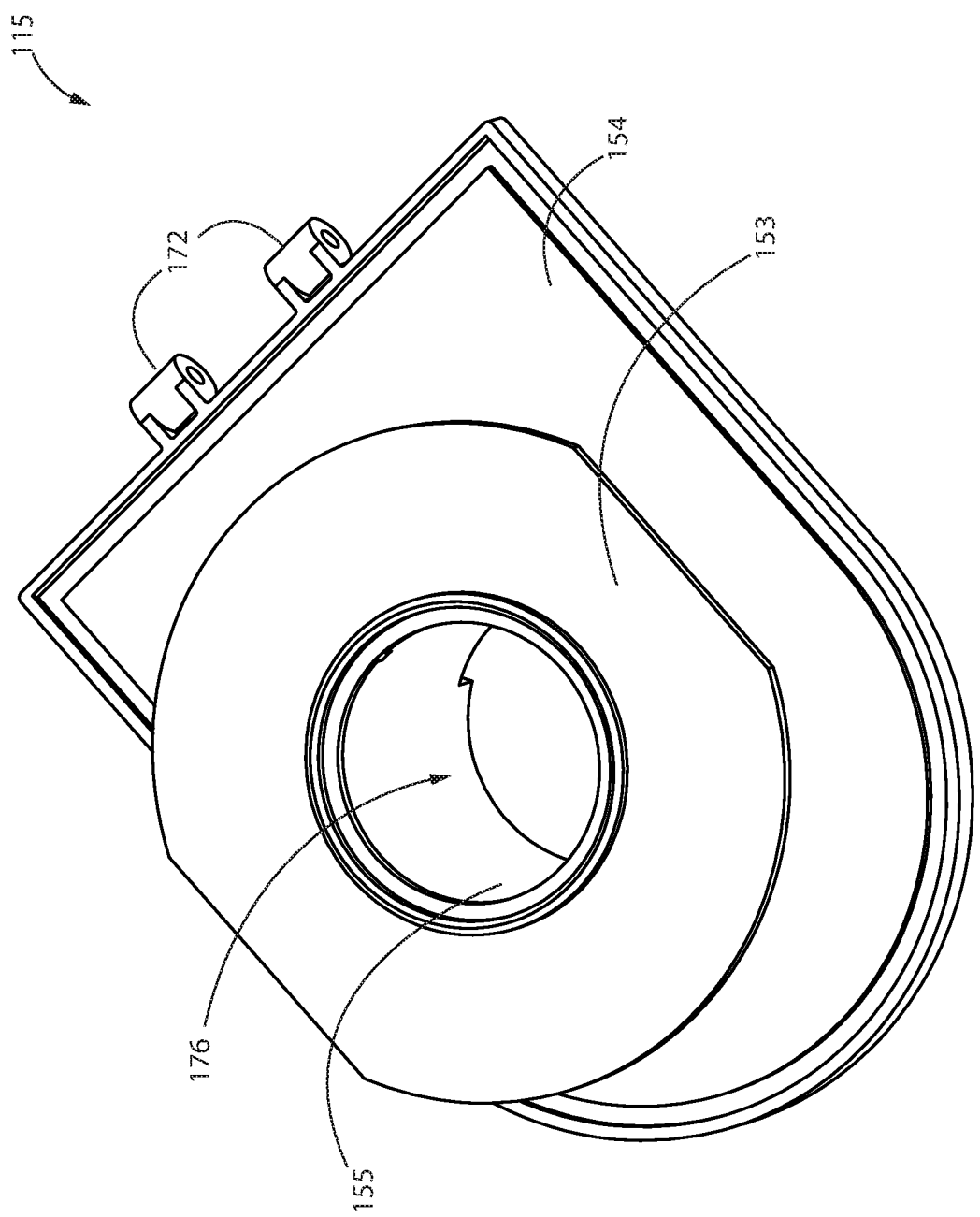
FIG. 10 is a perspective view from above of the first stage dirt collection chamber door of the surface cleaning apparatus of FIG. 1.
Figure 11:
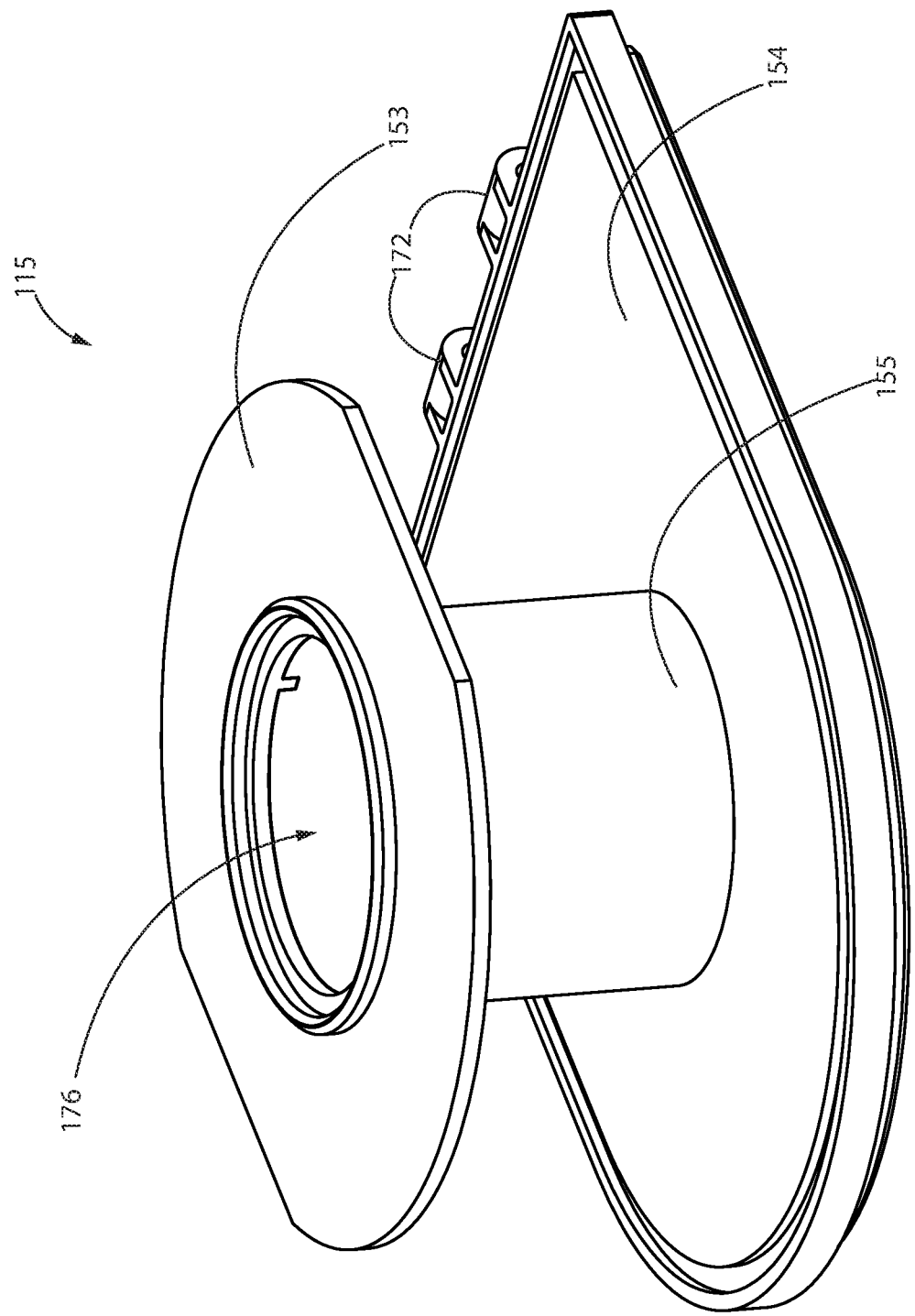
FIG. 11 is side perspective view of the first stage dirt collection chamber door of the surface cleaning apparatus of FIG. 1.

As exemplified in FIGS. 9-11, first door 115 comprises the first dirt collection chamber, which is defined by first end wall 153 and opposed, axially spaced apart first distal wall 154. The first end wall 153 of the first door 115 may be substantially parallel to distal wall 154. As exemplified, first end wall 153 is fixedly mounted to a support member 155 and support member 155 is fixedly mounted to distal wall 154. Accordingly, first end wall 153 is therefore moveable concurrently with distal wall 154. Support member 155 defines a lower portion of the nested second stage cyclone chamber. It will be appreciated that, in some embodiments, support member 155 may not be moveable (i.e., it may be fixed to the rest of the sidewall of the cyclone chamber and distal wall 154 may abut the lower surface of support member 155 and may be moveable with respect thereto). In such embodiments, the first stage cyclone chamber may not be openable from the first end wall.

It will be appreciated that in the exemplified embodiment of FIGS. 9-11, the first end wall 153 of the first door 115 is the same member as the second end wall 136 of the first stage cyclone 122. Accordingly, the first dirt collection chamber 124 is separated from the first stage cyclone 122 by the movable second end wall 136 (e.g. a first moveable plate). In other embodiments, the first end wall 153 may be separate from the second end wall 136.

As exemplified, second door 116 comprises the second dirt collection chamber, which is defined by second end wall 157 and opposed, axially spaced apart second distal wall 159. As exemplified, second end wall 154 is fixedly mounted to a support member 159 and support member 159 is fixedly mounted to distal wall 158. Accordingly, second end wall 154 is therefore moveable concurrently with distal wall 158.

It will be appreciated that the second door 116 of the second dirt collection chamber 125 may be moveable separately from the first door 115 of the first dirt collection chamber 124, as shown in FIGS. 2, 4 and 5.

When first door 115 is in a closed position, first door 115 co-operates with cyclone assembly sidewall 132 to form the first dirt collection chamber 124 (see FIG. 3). The first dirt collection chamber 124 may be of any suitable configuration and may be in any suitable position relative to the first stage cyclone 122 and may have any dirt inlet.

As exemplified in the Figures, first end wall 153 is spaced from distal wall 154 by first support member 155 extending axially therebetween. First support member 155 is generally annular in shape and defines an aperture 176 therein, which may extend the full length of support member 155 and define a portion of the second stage cyclone or a flow conduit. When the first door 115 is in a closed position, first support member 155 is positioned as an extension of the second cyclone sidewall 146 and aperture 176 forms at least a portion of the second stage cyclone chamber 143.

In the embodiment shown in the Figures, the first stage cyclone 122 includes a dirt outlet 151 through which dirt can exit the first stage cyclone 122. The first dirt collection chamber 124 is external to the first stage cyclone 122 and in communication with the first stage cyclone 122 via the first dirt outlet 151. In the embodiment shown in the Figures, the dirt outlet 151 is provided in the form of a slot or annular gap that extends around at least a portion of, and optionally all of, the perimeter of the cyclone sidewall 137, and is positioned between sidewall 137 and end wall 136. The slot or annular gap is located toward the second end of the first stage cyclone 122 proximate the second end wall 136. Optionally, as illustrated in this embodiment, at least most of the first dirt collection chamber 124 is positioned beneath the first stage cyclone 122, and the first dirt outlet 151 is provided in the bottom portion of the cyclone sidewall 137.

As dirt passes through the dirt outlet 151, it may fall by gravity onto distal wall 154 of first door 115 (if the cyclone assembly is oriented vertically). In this embodiment, the distal wall 154 of the first door 115 is a first stage dirt collection surface that is movably mounted to cyclone bin assembly 121 (e.g. via a pivot or hinge 170, described below).

When the second door 116 is in a closed position, the second door 116 co-operates with the first door 115 (i.e. the distal wall 154 of the first door 115) to form the second dirt collection chamber 125 (see FIG. 3). The second dirt collection chamber 125 may be of any suitable configuration and may be in any suitable position relative to the second stage cyclone 123 and may have any dirt inlet.

Figure 12:
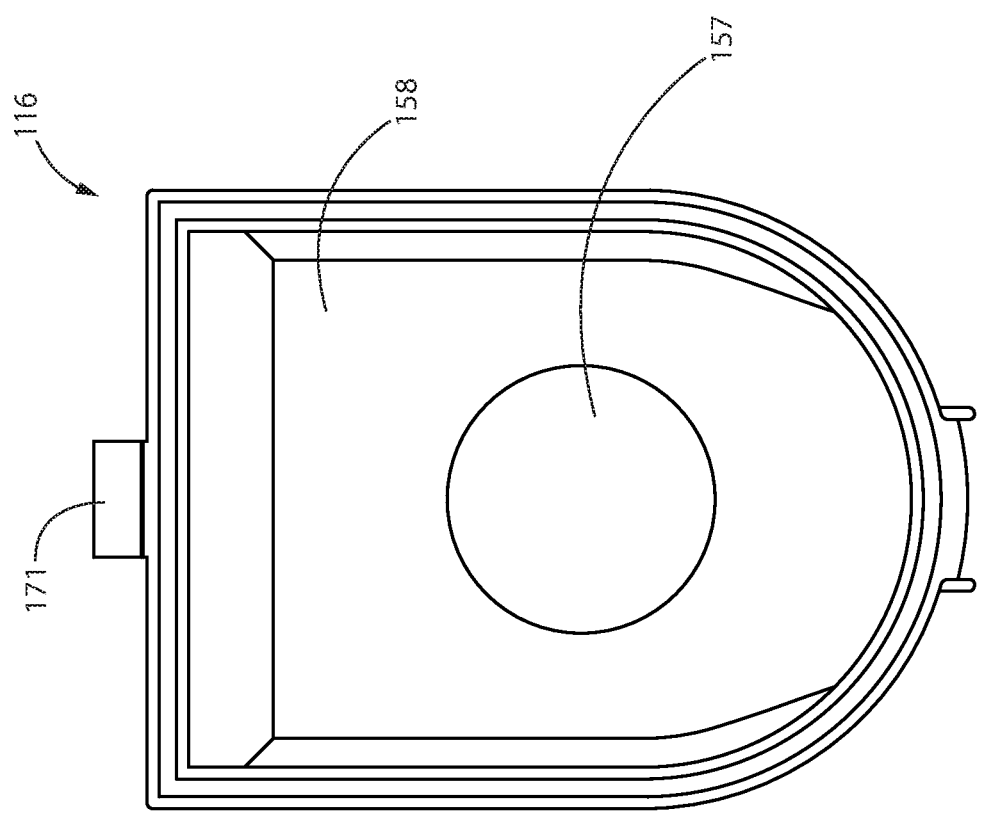
FIG. 12 is a top plan view of the second stage dirt collection chamber door of the surface cleaning apparatus of FIG. 1; and, FIG. 13 is a top perspective view of the second stage dirt collection chamber door of the surface cleaning apparatus of FIG. 1.
Figure 13:
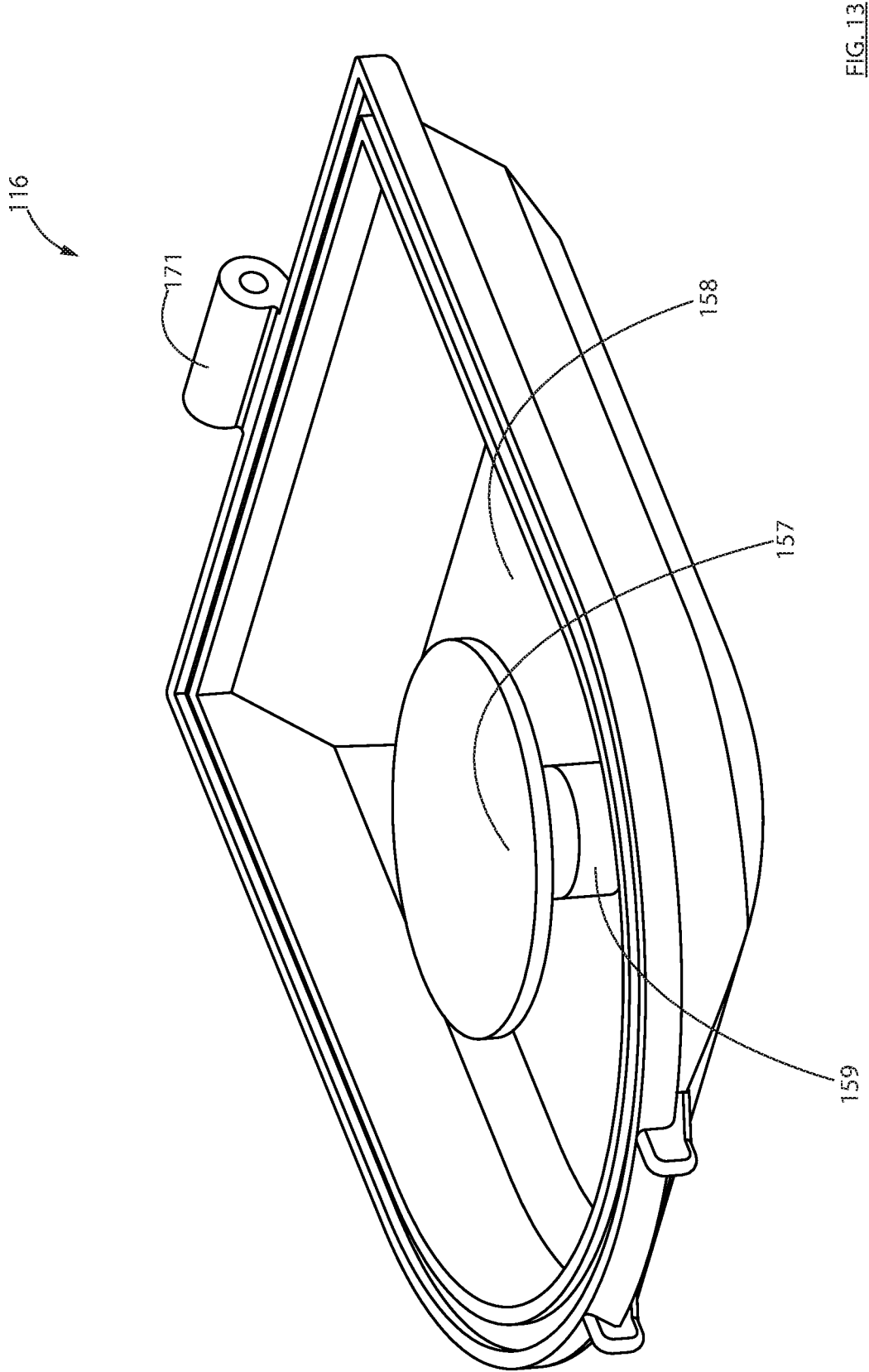

In the embodiment shown in the Figures, particularly FIGS. 12 and 13, the second door 116 includes a first end wall 157, an opposed distal wall 158 and a second support member 159 extending therebetween. In this embodiment, the first end wall 157 of the second dirt collection chamber 125 is the same as the second end wall 145 of the second stage cyclone 123. In this configuration, the second dirt collection chamber 125 is separated by the second stage cyclone 123 by the movable second end wall 145 (e.g. a second moveable plate). In other embodiments, the first end wall 157 of the second dirt collection chamber 125 may be separate from the second end wall 145 of the second stage cyclone 123. In such a case, the first end wall 157 of the second dirt collection chamber 125 may be generally planar and may be substantially parallel with the second end wall 145 of the second stage cyclone 123.

Further, in this configuration, the second dirt collection chamber 125 is separated by the first dirt collection chamber 124 by the movable distal wall 154 of the first door 115. The first end wall 157 of the second dirt collection chamber 125 may be substantially parallel with the distal wall 154 of the first door 115.

In the embodiment shown in the Figures, the second stage cyclone 123 includes a dirt outlet 163 through which dirt can exit the second stage cyclone 123 and the second dirt collection chamber 125 is external the second stage cyclone 123 and in communication with the second stage cyclone 123 via the dirt outlet 163. In this embodiment, the dirt outlet 163 is provided in the form of a slot or annular gap that extends around at least a portion, and optionally all of, the perimeter of the second stage cyclone sidewall 146, and is positioned between support member 155 and end wall 163. The slot or annular gap is located toward the second end of the second stage cyclone 123 proximate the second end wall 145, although the dirt outlet may be of different configurations and in different locations. Optionally, as illustrated in this embodiment, at least most of the second dirt collection chamber 125 is positioned below the second stage cyclone 123, and the dirt outlet 163 is provided in the lower portion of the cyclone sidewall 146.

As dirt passes through the dirt outlet 163, it may fall by gravity onto distal wall 158 of second door 116 (if the cyclone assembly is oriented vertically). In this embodiment, the distal wall 158 of the second door 115 is a second stage dirt collection surface that is movably mounted to cyclone bin assembly 121 (e.g. via a hinge 170, described below).

As shown in FIGS. 4 and 5, to open the second dirt collection chamber 125 for emptying, second door 116 is openable about a hinge or pivot 170. In the embodiment shown in the Figures, the first end wall 157 of the second dirt collection chamber 125 is integral with the second end wall 145 of the second stage cyclone 123, such that opening the second door 116 moves the first end wall 157 and opens the second dirt collection chamber 125 for emptying. As exemplified in FIG. 6, the second door 116 is pivotally connected to the side wall 132 of the cyclone assembly by a second hinge or pivot portion 171 such that the second end wall 145 is pivotal about a lateral pivot axis 173 (see FIG. 4). The second door 116 may be held in its closed position using any suitable mechanism, including a friction fit with the sidewall 132 and/or by using a latch (such as latch 175 shown in FIGS. 1-7 which has a distal hook end that engages with door 116). Alternatively, instead of being pivotally connected, the second door 116 may be detachable (removable) from the sidewall 132 or otherwise openable.

As shown in FIG. 5, to open the first dirt collection chamber 124 for emptying, first door 115 is openable about hinge 170. In the embodiment shown in the Figures, the first end wall 153 of the first dirt collection chamber 124 is integral with the second end wall 136 of the first stage cyclone 122, such that opening the first door 115 moves the first end wall 153 and opens the first dirt collection chamber 124 for emptying. As exemplified in FIG. 6, the first door 115 is pivotally connected to the side wall 132 of the cyclone assembly 121 by first hinge or pivot portions 172 such that the second end wall 136 is also pivotal about the lateral pivot axis 173. The first door 115 may be held in its closed position using any suitable mechanism, including a friction fit with the sidewall 132 and/or by using a latch similar to latch 175 (and which engages first door 115) and/or by second door 116 to secure first door 115 in position when latch 175 engages the second door 116. Alternatively, instead of being pivotally connected, the first door 115 may be detachable (removable) from the sidewall 132 or otherwise openable.

As shown in FIG. 5, the first door 115 and second door 116 are concurrently openable. As the first door 115 opens, the first dirt collection surface of distal wall 154 of first door 115 rotates open to a first position which defines a first opening angle A between the first dirt collection surface of distal wall 154 and the lower end 177 of the sidewall of the first dirt collection chamber. Similarly, as the second door 116 opens, the second dirt collection surface of distal wall 158 of second door 116 also rotates open to a second position which defines a second opening angle B between the second dirt collection surface 145 and the lower end 177 of the sidewall of the first dirt collection chamber. The second opening angle is greater than the first opening angle.

When the first door 115 and second door 116 are each in an open position (or their first and second positions as described above), the first stage dirt collection surface of distal wall 154 of first door 115 and the second stage dirt collection surface of distal wall 158 of the second door 116 may be biased apart from each other (e.g. by a spring provided on a pivot pin of pivot 170). An advantage of this design is that dirt collected in the second dirt collection chamber may be emptied and not trapped in the second stage dirt collection region by distal wall 154 abutting the second door 116.

In the embodiments shown in the Figures, the first and second dirt collection chambers 124, 125 are positioned such that the hinge 170 is provided toward the rear end of the cyclone assembly 121 and at the bottom side, whereby the bottom portions of the cyclone assembly 121 are openable. In this configuration, the movable portions of the cyclone assembly 121 (as discussed above) are pivoted generally downward and rearward, which creates a generally lower facing opening through which the dirt and debris is emptied. This may help reduce the likelihood of debris contacting or becoming stuck on portions of the first stage cyclone 122, first dirt collection chamber 124, second stage cyclone 123 and second stage dirt collection chamber 125.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:
1. A surface cleaning apparatus comprising:
(a) an air flow path extending from a dirty air inlet to a clean air outlet;
(b) a suction motor provided in the air flow path;
(c) a cyclone bin assembly comprising first and second stage cyclones;

(d) the first stage cyclone provided in the air flow path, the first stage cyclone comprising a first stage cyclone chamber and a first stage dirt collection region external to the first stage cyclone chamber, the first stage cyclone chamber having a first stage air inlet, a first stage air outlet, a first stage dirt outlet, a first stage sidewall, a first stage first end wall and a first stage second end wall that is spaced from the first stage first end wall, wherein the first stage dirt outlet comprises a space between the first stage second end wall and the first stage sidewall and wherein the first stage second end wall is moveable between a closed position in which the first stage sidewall and the first stage second end wall define the first stage dirt outlet and an open position in which an end of the first stage cyclone chamber is open; and, (e) the second stage cyclone provided in the air flow path downstream of the first stage cyclone, the second stage cyclone comprising, a second stage cyclone chamber and a second stage dirt collection region external to the second stage cyclone chamber, the second stage cyclone chamber having a second stage air inlet, a second stage air outlet, a second stage dirt outlet, a second stage sidewall, a second stage first end wall and a second stage second end wall that is spaced from the second stage first end wall, wherein the second stage dirt outlet comprises a space between the second stage second end wall and the second stage sidewall and wherein the second stage second end wall is moveable between a closed position in which the second stage sidewall and the second stage second end wall define the second stage dirt outlet and an open position in which an end of the second stage cyclone chamber is open, wherein the first stage second end wall and the second stage second end wall are concurrently openable and the second stage second end wall is moveable separately from the first stage second end wall.

2. The surface cleaning apparatus of claim 1 wherein the first stage dirt collection region has a first stage distal wall that is spaced from and faces the first stage second end wall and the first stage distal wall is moveably mounted to the cyclone bin assembly and the second stage dirt collection region has a second stage distal wall that is spaced from and faces the second stage second end wall and the second stage distal wall is moveably mounted to the cyclone bin assembly.

3. The surface cleaning apparatus of claim 2 wherein, when the first stage and second stage distal walls are in the open position, the first stage and second stage distal walls are biased apart.

4. The surface cleaning apparatus of claim 2 wherein the first stage distal wall rotates open to a first position which defines a first opening angle between the first stage distal wall and the cyclone bin assembly and the second stage distal wall rotates open to a second position which defines a second opening angle between the second stage distal wall and the cyclone bin assembly and the second opening angle is greater than the first opening angle.

5. The surface cleaning apparatus of claim 4 wherein, when the first stage distal wall and the second stage distal wall are in the open position, the first stage distal wall and the second stage distal wall are biased apart.

6. The surface cleaning apparatus of claim 1 wherein the second stage cyclone chamber is nested inside the first stage cyclone.

7. The surface cleaning apparatus of claim 1 wherein the first stage second end wall is mounted to a portion of the second stage cyclone.

8. The surface cleaning apparatus of claim 1 wherein the first stage second end wall is fixedly mounted to a support member extending generally axially from the first stage distal wall.

9. The surface cleaning apparatus of claim 1 wherein the first stage air inlet is provided adjacent the first stage first end wall and the second stage air inlet is provided adjacent the second stage first end wall.

10. A surface cleaning apparatus comprising:
(a) an air flow path extending from a dirty air inlet to a clean air outlet;
(b) a suction motor provided in the air flow path;
(c) a cyclone bin assembly comprising first and second stage cyclones;
(d) the first stage cyclone provided in the air flow path, the first stage cyclone comprising a first stage cyclone chamber and a first stage dirt collection region, the first stage cyclone chamber having a first stage air inlet, a first stage air outlet, a first stage dirt outlet, a first stage first end wall and a first stage second end wall that is spaced from the first stage first end wall, wherein the first stage second end wall is moveable between a closed position in which the first stage cyclone chamber is closed and an open position in which an end of the first stage cyclone chamber is open; and,
(e) the second stage cyclone provided in the air flow path downstream of the first stage cyclone, the second stage cyclone comprising a second stage cyclone chamber and a second stage dirt collection region external to the second stage cyclone chamber, the second stage cyclone chamber having a second stage air inlet, a second stage air outlet, a second stage dirt outlet, a second stage sidewall, a second stage first end wall and a second stage second end wall that is spaced from the second stage first end wall, wherein the second stage second end wall is moveable between a closed position in which the second stage cyclone chamber is closed and an open position in which an end of the second stage cyclone chamber is open,
wherein the first stage second end wall is provided on a portion of the second stage cyclone and the first and second dirt collection regions are concurrently openable.

11. The surface cleaning apparatus of claim 10 wherein the first stage second end wall is provided on a moveable portion of the second stage cyclone.

12. The surface cleaning apparatus of claim 11 wherein the first stage dirt collection region has a first stage distal wall that is spaced from and faces the first stage second end wall and the first stage second end wall is fixedly mounted to a support member extending generally axially from the first stage distal wall.

13. The surface cleaning apparatus of claim 10 wherein the second stage cyclone chamber is nested inside the first stage cyclone.

14. The surface cleaning apparatus of claim 10 wherein, when the first and second dirt cyclone chambers are open, the first and second end walls are biased apart.

15. The surface cleaning apparatus of claim 11 wherein the first stage dirt collection region has a first stage distal wall that is spaced from and faces the first stage second end wall, the second stage dirt collection region has a second stage distal wall that is spaced from and faces the second stage second end wall and the first and second stage distal walls define opposed ends of the second stage dirt collection region.

16. A surface cleaning apparatus comprising:
(a) an air flow path extending from a dirty air inlet to a clean air outlet;
(b) a suction motor provided in the air flow path;
(c) a cyclone bin assembly comprising first and second stage cyclones;
(d) the first stage cyclone provided in the air flow path, the first stage cyclone comprising a first stage cyclone chamber and a first stage dirt collection region, the first stage cyclone chamber having an openable first stage end wall, wherein the first stage end wall is moveable between a closed position in which the first stage cyclone chamber is closed and an open position in which an end of the first stage cyclone chamber is open, and wherein the first stage dirt collection region has a first stage distal wall that is spaced from and faces the first stage end wall; and,
(e) the second stage cyclone provided in the air flow path downstream of the first stage cyclone, the second stage cyclone comprising a second stage cyclone chamber and a second stage dirt collection region external to the second stage cyclone chamber, the second stage cyclone chamber having an openable second stage end wall, wherein the second stage end wall is moveable between a closed position in which the second stage cyclone chamber is closed and an open position in which an end of the second stage cyclone chamber is open,
wherein the first stage distal wall is a wall of the second stage dirt collection region.

17. The surface cleaning apparatus of claim 16 wherein the first stage end wall is provided on a portion of the second stage cyclone and the first and second cyclone chambers are concurrently openable.

18. The surface cleaning apparatus of claim 17 wherein the first stage end wall is provided on a moveable portion of the second stage cyclone.

19. The surface cleaning apparatus of claim 16 wherein, when the first and second end walls are in the open position, the first and second end walls are biased apart.

20. The surface cleaning apparatus of claim 16 wherein the first stage end wall rotates open to a first position which defines a first opening angle between the first stage end wall and the cyclone bin assembly and the second stage end wall rotates open to a second position which defines a second opening angle between the second stage end wall and the cyclone bin assembly and the second opening angle is greater than the first opening angle.

* * * * *